F. S. GUY & E. M. SMITH.
FILTER PRESS.
APPLICATION FILED JUNE 17, 1910.
1,069,546.
Patented Aug. 5, 1913.
3 SHEETS—SHEET 1.
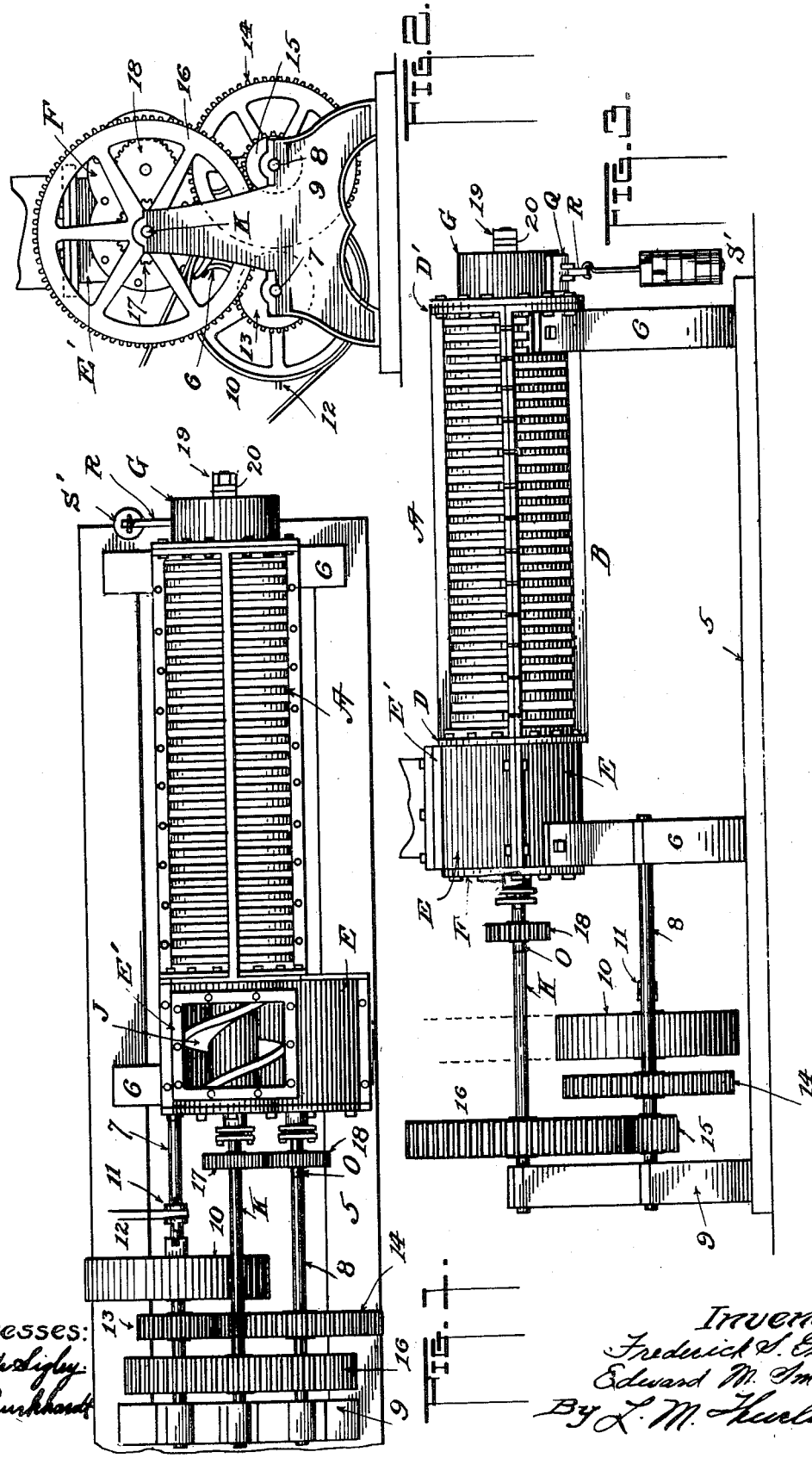

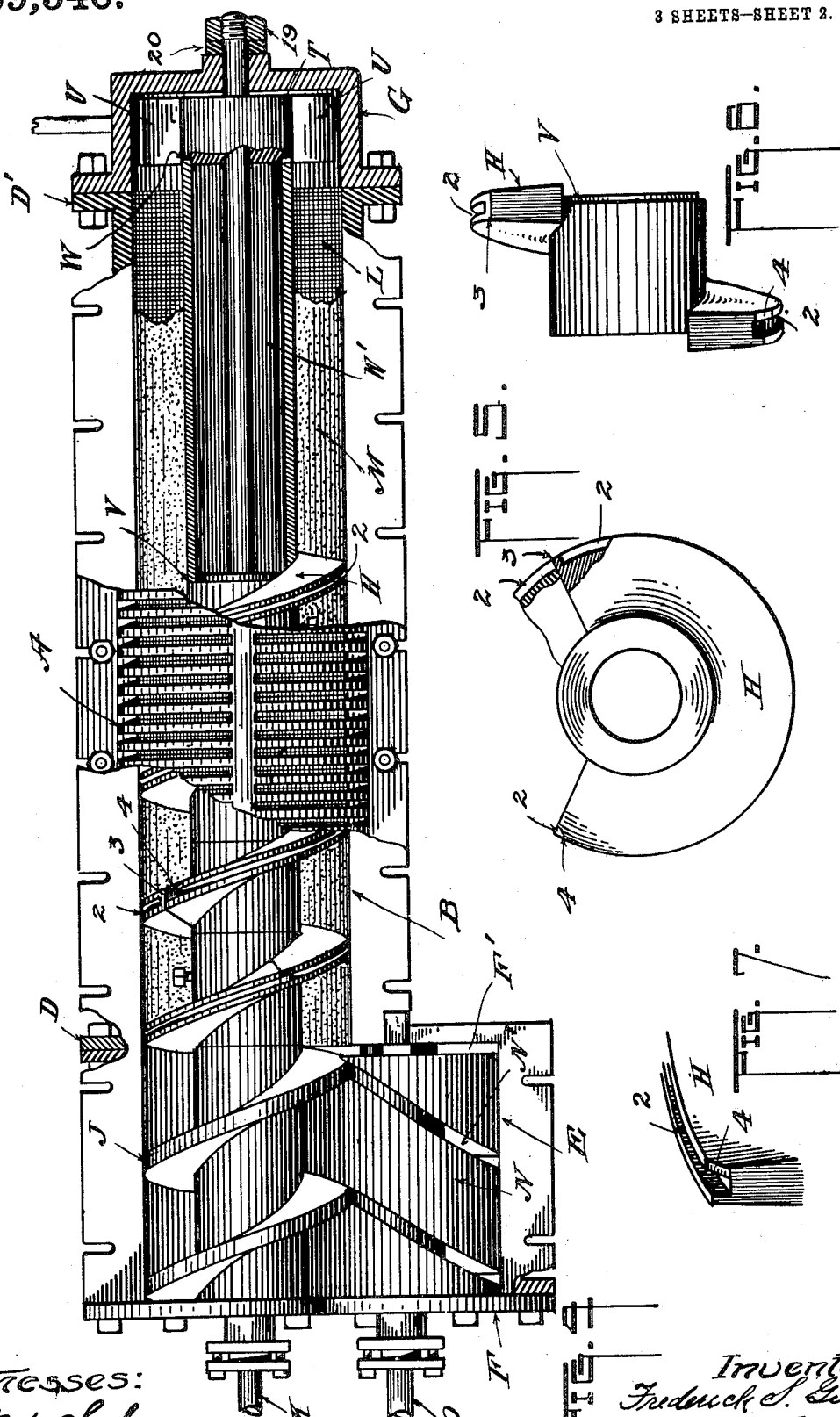

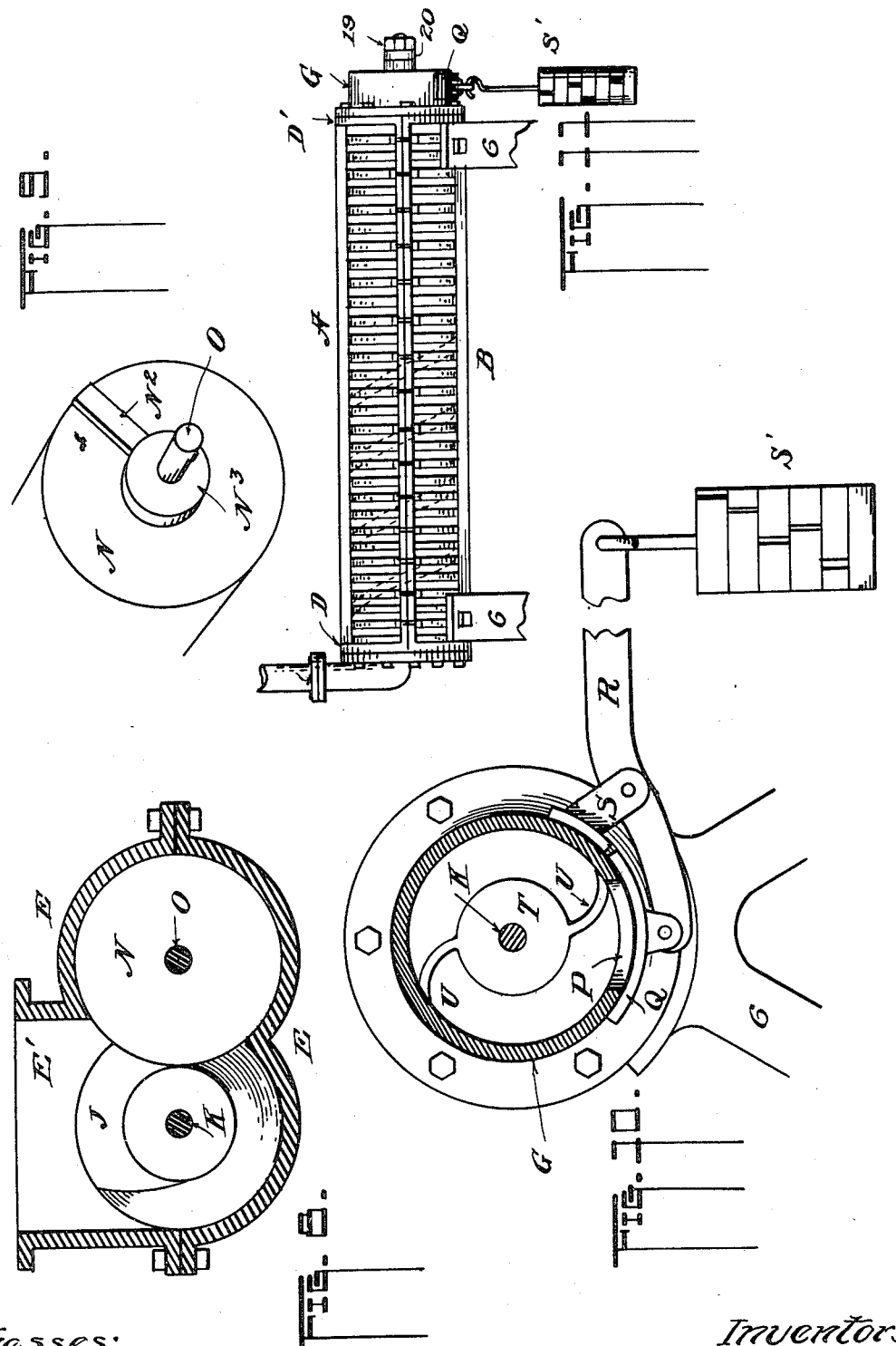

UNITED STATES PATENT OFFICE.

FREDERICK S. GUY AND EDWARD M. SMITH, OF PEORIA, ILLINOIS; SAID GUY ASSIGNOR TO SAMUEL C. FIDDYMENT, OF LOCKPORT, ILLINOIS.

FILTER-PRESS.

1,069,546.

Specification of Letters Patent.   Patented Aug. 5, 1913.

Application filed June 17, 1910.   Serial No. 567,391.

*To all whom it may concern:*

Be it known that we, FREDERICK S. GUY and EDWARD M. SMITH, citizens of the United States, residing at Peoria, in the county of Peoria and State of Illinois, have invented certain new and useful Improvements in Filter-Presses; and we do hereby declare that the following is a full, clear, and exact description of the invention, which will enable others skilled in the art to which it appertains to make and use the same.

This invention relates to a filter press designed particularly for the separation of distillery and brewery slops although adapted as well for treating other materials needing separation.

One of the objects of the invention is to provide an improved filter press of the screw-conveyer type.

A further object is to improve upon the arrangement of filter press described and shown in the patent issued to Frederick S. Guy on November 25th 1902 No. 714,174 in order to make a more thoroughly practicable apparatus.

The invention besides the above has for an object the provision of a peculiar arrangement of parts and an improved form of screw-conveyer.

In the appended drawings:—Figure 1 is a plan of one form of the filter press and its operating gear. Fig. 2 is an end elevation thereof. Fig. 3 is a side elevation. Fig. 4 is a plan of the filter press drawn on a larger scale showing its interior form and arrangement. Fig. 5 is an end elevation of a section of a conveyer. Fig. 6 is a side elevation of the same. Fig. 7 shows a portion of the conveyer-section in perspective. Fig. 8 is a transverse sectional elevation of a portion of the filter press showing two interengaging members shown in Fig. 4. Fig. 9 shows, in perspective, a portion of one of the members shown in Figs. 4 and 8. Fig. 10 is an end elevation of a part of the filter press showing certain of its parts in cross section, and Fig. 11 is a side elevation of the press in its simplest form.

Our filter is patterned, as to its appearance and some of its parts, much after that shown in the Frederick S. Guy patent referred to and like that apparatus consists preferably of an upper and lower cast cylinder-section A and B respectively, made in the form of a grating to allow for the free escape of fluid. Each end of the cylinder thus constructed has a flange D D' to the first of which is bolted a flanged double cylinder or double-screw housing consisting of an upper and lower member E E, Fig. 8, there being a plate or head F bolted to said double cylinder to close its open end.

To the opposite flange D' is bolted a hollow head G in the form of a "hat" which tightly closes that end of the cylinder. The bore of the said head is preferably equal in diameter to that of the cylinder and the bore of the latter is the same diameter throughout its length.

Lying in the cylinder is a screw-conveyer H constructed somewhat in the manner as the ordinary screw-conveyer and this occupies substantially one half of the length of the cylinder and lies in what may be termed the rear end of the latter or that end nearest the double cylinder E. Adjacent to said conveyer and positioned within the said double cylinder E is also a screw-conveyer J, both said conveyers H and J working in conjunction and arranged whereby both in revolving will carry material in the same direction. A shaft K carries both conveyers and has its bearings in the heads F and G and both said conveyers are securely held on the shaft so as to be positively driven thereby. Lying in the bore of the cylinder against its walls is a perforated lining consisting, for instance, of a piece of wire gauze L upon which is preferably placed a second perforated inner lining M, the conveyer revolving within the lining M in close proximity to it though not permitted to rub upon it.

The double cylinder E has a cavity F' which communicates with the bore containing the conveyer J, and in this cavity is a member N provided in the present instance with a spirally cut groove N' in which the flight of the conveyer J seats and works; said member N being carried on a shaft O suitably mounted in the end wall of the said double cylinder and in the head F. The said member N and the conveyer J necessarily revolve in opposite directions or toward one another, the purpose of which is to provide a continuous pressure as will be described later although it is to be understood that this arrangement of device may perhaps be altered. The head G hereinbefore described is provided in its under side with a discharge opening P which is covered by a trap-valve Q carried at one end of a lever R having its fulcrum for instance on a hanger S attached to the body of the press as in Fig. 10; the outer end of said lever having a weight S' suspended therefrom which may be arranged to hold the trap upon the opening P with a variable pressure by which any desired pressure may be placed upon the material before it is discharged but this is common to presses of this type. Within the said head G and carried by the shaft K is a sweep consisting of a hub T with two arms U radiating from it which discharge the material through the opening P. The said hub T is substantially the same diameter as the hubs of the conveyers H and J and has an annular groove W in its end facing the conveyer H and the hub of said conveyer H is provided with a shoulder, for instance, as indicated at V in Fig. 4. Between the hubs thus arranged, with one end in the groove W and the other engaging the hub having the shoulder, is a pipe W' whose exterior diameter is substantially equal to those of the hubs. The annular space between the walls of the cylinder and the pipe and between the walls of the head G and said pipe thus measures the same throughout.

Especial attention is now directed to the construction of the spiral conveyer H lying in the cylinder A B. This is preferably made in sections both for convenience in casting and also so that the conveyer may be changed in length to suit the size of apparatus under construction. One of the sections is shown in Fig. 6 and Figs. 4 and 5 show the manner in which the ends of the several sections abut so as to make a screw-conveyer having a continuous unbroken flight. The peculiarity of our form of screw-conveyer is that in the edge of the flight of each section is a groove 2 which, as shown in Figs. 5, 6 and 7, may be closed at one end and open at its other or both ends may be closed if desired. In the present instance, however, the open end of the groove of one section is closed by means of a wall 3 of an adjacent section where the two said sections abut. As shown in Fig. 7 a portion of one of the side walls of the groove at the open end, for instance, is removed leaving a notch as indicated at 4. Though not shown the conveyer J may be also provided with a groove such as has been described though in practice it has a particular purpose and advantage as used on the conveyer H and this will presently appear.

In order that the press and its gearing can be transported as a unit we provide a cast base 5 to which are bolted standards or legs 6 which support the cylinder A B. On one of the standards 6 are journaled the ends of two shafts 7 and 8 whose other ends are mounted in a second outer standard or leg 9. On the shaft 7 is a loose pulley 10 made to drive the shaft when desired by means of a clutch section 11 slidable on said shaft and revoluble therewith and operated by a suitable lever 12. Adjacent the pulley is a pinion 13 which meshes with a gear 14 on the opposite shaft 8, while a pinion 15 on the latter shaft meshes with a gear 16 on the shaft K of the press and said shaft K, through a gear 17 thereon, imparts a reverse direction of movement to the shaft O before described through a gear 18 on that shaft.

The upper section of the double cylinder portion E is provided with an open hopper E' into which the material to be separated is discharged and this said hopper is preferably immediately above the conveyer or screw J and the direction of revolution of said conveyer J is such that the material is carried into the cylinder A B, and into the conveyer H and moved toward the discharge end of said cylinder. The double screw arrangement made up of the said conveyer J and its companion member N are used in order to positively force the material under treatment into the cylinder A B; said arrangement acting much in the same capacity as the well known rotary pump; the parts J and N working so closely together as to literally pump the material and maintain a continuous pressure thereon toward the conveyer H. With some kinds of slop such as brewers slop, for instance, the use of this pressure device has been found to be of importance and of value while for the separation of distillery slop the simpler form of press shown in Fig. 11 answers. This may be better understood by stating that distillers' slops are in a semi-fluid state so as to readily flow due to the large percentage of water so that such material will readily be moved along by the conveyer H until at about the time it has reached the end of that member it is sufficiently free of water so that it can be packed under pressure at the open end of the cylinder. Brewer's grains or slop, however, are of a very different consistency, that is to say, the percentage of water as compared with that of distiller's slop is very much less and in fact so much less that the material is almost a pasty mass in consequence of which it would stick to the conveyer H and revolve with it as a solid mass in the absence of pressure behind it as provided, for instance, by such an arrangement as the screw J and member N. Since these parts J and N work at a snug fit the material must move forward into the cylinder A B and after its passage into the latter the separation of the solids and fluids begins. The cylinder by being in the form of a grating and in having the straining portions L M, provides for the escape of the fluids but it has been found that the gluten and particles of grain quickly cover or fill the openings in the strainer M thus closing them to the free passage of said fluids. In order to provide for keeping the strainer free of these materials it has been found necessary to keep it constantly wiped. We have employed heretofore, a continuous strip of rubber or metal packing upon the edge of the conveyer but besides being detrimental to the strainer it was found that this packing soon wore away so that at short intervals said packing needed replacing as well as the strainer. Such a form of packing is unsatisfactory, also, in that it is hardly possible to make it fit snugly in the strainer so as to keep the entire surface of that member swept free of the gluten. We have found that by providing the open groove 2 in the edge of the conveyer, as described hereinbefore, it will fill with the solid portions of the slop which form a natural packing that entirely conforms to the surface of the strainer and keeps said strainer perfectly clean at all points. Preferably the grooves are divided into a series of short grooves as described, within each of which the solid material will tightly pack. This material is always in intimate working contact with the strainer and as parts of it are removed by rubbing upon said strainer they are at once replaced with more so that the natural packing thus provided is always performing its duty while the press is in operation. The effect produced by the packing is quite marked, in that, as the conveyer revolves a stream of fluid is seen to issue through the strainer immediately behind the flight and follows said flight throughout its entire length showing the perfect work done. This constant clearing of the strainer creates a ready relief for the fluids and discharges a very much larger amount of fluid in a given time than under the older method. It has been stated quite early herein that the conveyer H is not permitted to have contact with or rub upon the lining M though working quite close to it. Experience has taught that if the conveyer or any solid packing thereon is allowed to rub upon the said lining that member is destroyed in a very short time. Our aim, therefore, is to provide against this result and cause the solid materials to fill the space intervening between the conveyer and the strainer as already described. There is thus no needed outlay for packings or new strainers. The action of the press can, therefore, be continuous since it can remain in constant and uninterrupted action for long periods of time without any attention whatever.

By providing a series of short grooves in communication with the interior of the cylinder each very quickly fills and is kept filled with solid parts which enter through the opening 4. A continuous pressure is kept upon the material in the grooves due to the back pressure of the material which enters through the opening 4 and said material must necessarily be forced outward against the strainer.

Considerable space is left between the veyer H and the discharge end of the cylinder at the head G in which the solid portions can be placed under pressure and this said space is an annular one and as stated hereinbefore has substantially the same measurement throughout its length due to the pipe W' and for this reason the solid material can be forced toward the discharge opening with the least amount of power and strain on the machine since there are no shoulders or projections to retard the movement of the mass under pressure. The material in its solid tubular form can therefore be worked toward the discharge opening without being changed in form. As the mass comes in contact with the arms U of the sweep it is pulverized and discharged through the opening P.

Since there is necessarily considerable end pressure upon the shaft K in a direction opposite to that in which the pressure on the material is applied, a thrust bearing for the shaft is provided through the use of a threaded nut 19 on the shaft which bears upon a washer 20 lying next to the head G which in turn bears against the hub extension on the head G as shown. By adjusting the nut the shaft can be shifted in the direction of its length and all lost motion readily taken up and the thread that receives the nut is so cut on the shaft that the tendency of said nut is rather to tighten than otherwise, during the revolution of said shaft.

As distinguished from the press of the Guy patent above, the inlet for the material to be treated is at the end having the double screw and the discharge is at the end of the cylinder A B opposite said double screw. This arrangement is found to yield far more satisfactory results and at a smaller operating expense, by eliminating an outside pumping device, and with a smaller outlay for apparatus in consequence. It is found that there is a far better separation of the materials under treatment by placing the interengaging portions J, N, at the receiving end of the machine to receive the slop instead of placing it at the discharge end. The solid parts need no special pressure device of the double screw order; the pressure from the screw or conveyer H upon the material being sufficient before reaching the outlet. But by placing the said double screw at the inlet end the slop is directly received thereby and forced toward and into the strainers. The bulk of material the said double-screw is capable of handling is substantially equal to that entering the inlet opening and the said double-screw can move it away and dispose of it in a much shorter time than by the older methods. And not this alone, it is moved so rapidly that the liquid parts are discharged with force through the strainer assisting thereby in keeping the latter free of obstructing matter and the fluids thereby quickly pass out while the solids are more quickly gathered by the screw H and forced toward the exit. We have then, as advantages over the earlier forms of press, the reduction of cost of operation, the reduction in the cost of the necessary apparatus, and the quicker handling of a given bulk of slop in a given time by a peculiar arrangement of the parts in the relation they bear to one another.

A speedy handling of the slop is the result and a continuous discharge of solid materials is made possible. The member N which operates in conjunction with the conveyer or screw J is provided with a sweep N² at one end as shown in Fig. 9. A space is left between the end of said member N and the adjacent end wall of the members E except as to a hub N³ which bears against said wall. The said sweep may be cast with or secured to the member on its end face and lying in said space.

It has been found in practice that if the end face of the member N is allowed to bear directly against the said end wall the solid materials in the slop collecting between these parts will become packed thus making the machine "stick" and resulting in the driving belt being thrown off. But by making the member a little less in length than the length of the bore that receives it and placing said sweep N² in the space thus created the material is kept thoroughly cleared away.

Having thus described our invention, we claim.

1. In a filter press, the combination with a receptacle to receive the material to be separated and arranged for the free discharge of fluids therefrom, having a receiving opening and a discharge opening, of means in the receptacle for receiving the said material and positively forcing it toward the discharge opening comprising two rotating, engaging parts within said receptacle, and a member situated between the means and the discharge opening for positively moving the solid materials toward said opening.

2. In a filter press, the combination with a receptacle having a receiving opening and a discharge opening widely separated, said receptacle arranged for the free discharge of fluids therefrom, of means within the receptacle for directly receiving material from said receiving opening for positively forcing it toward the discharge opening comprising two rotating engaging parts within said receptacle, and a single member lying between the said means and the discharge opening to receive the solid material from said means and positively move it toward said discharge opening.

3. In a filter press, the combination of a receptacle having a receiving opening for the material to be separated and a discharge opening for the solid parts of the same, means within the receptacle to receive and positively move the material toward the said discharge opening comprising a screw conveyer and a rotating part to work in intimate engagement therewith, and a single continuous conveyer interposed between the said means and the said discharge opening but separated from the latter by a space.

4. In a filter-press the combination of a body provided with a cylindrical bore, and having provision in a portion of its walls for the discharge of liquid, a strainer covering said portion, a screw conveyer revoluble within the strainer and extending throughout a part of the length of the latter, a discharge opening in the cylinder, means at said opening for ejecting solid matter therethrough and separated from the conveyer by a space, there being a receiving opening in said cylinder, and means in the cylinder adjacent to the opening comprising interengaging screw portions to receive the material to be treated.

5. In a filter press the combination of a body provided with a bore and having provision in a portion of its wall for the discharge of liquids, said body having an inlet opening, a pressure device within the body to receive the material to be treated comprising two interengaging screw portions, a screw conveyer within the bore and arranged to receive the material from said device, and a discharge opening for the solid material beyond said screw conveyer.

6. In a filter-press the combination of a body provided with a bore and having a cylindrical perforate wall, a screw conveyer therein whose periphery is separated from said wall by a space, there being a receiving opening in the body for receiving the material to be treated, a pressure device for receiving said materials within the body comprising two interengaging screw portions, the axis of one of them coinciding with the axis of the screw conveyer, and a single shaft carrying said conveyer and the coinciding screw portion that part of the body having the said device being imperforate.

7. In a filter-press the combination of a body provided with a bore and having a cylindrical perforate inner wall, a screw conveyer therein whose periphery is provided with an open groove and separated from said wall by a space, said body having a receiving opening for the material to be treated, a pressure device seated in a part of said bore adjacent the receiving opening comprising two interengaging screw portions, that part of the body having the device being imperforate, and a single shaft carrying the screw conveyer and one of the screw portions.

8. In a filter press, the combination of a receptacle having a receiving opening and a discharge opening, means for directly receiving slop from said receiving opening comprising a hub having a spirally arranged flight and an adjoining hub having a spirally arranged groove to receive said flight and adapted to positively force the slop toward the discharge opening, a single continuous screw-conveyer adjoining the said device at one end and separated at its other end from the discharge opening by a space, and means to positively discharge the solid materials of the slop through said discharge opening.

9. A filter press comprising a receptacle for the material to be separated and provided with a receiving and a discharge opening, that part of the receptacle having said receiving opening being otherwise imperforate, means within the imperforate portion of the receptacle for receiving the material comprising two interengaging positively driven members to positively force the material in the direction of the discharge opening, and a member between the said means and the discharge opening to receive the material from the former and discharge it through the latter.

10. A filter press comprising a receptacle for the material to be separated and provided with a receiving opening and a discharge opening, that part of the receptacle in the vicinity of said receiving opening being otherwise imperforate, means within the imperforate portion for receiving the material comprising two interengaging positively driven members to positively force the material in the direction of the discharge opening, a member lying between the said means and the discharge opening to discharge the solid material through the said discharge opening and a perforate lining within the receptacle to inclose said member.

11. In a filter press, the combination of a receptacle having a receiving inlet opening for slop, and a discharge opening, a screw-conveyer between the inlet and discharge openings, and means situated between the conveyer and the inlet opening for receiving the material to be separated, the same comprising two interengaging members adapted to revolve together and adapted also for positively moving slop toward and into said conveyer.

12. In a filter press, the combination of a cylinder having a discharge opening at one end, a screw-conveyer arranged in said cylinder, a member secured at the end of said cylinder opposite the end having said discharge opening and having twin bores communicating with and paralleling one another, one of them coinciding with the bore of the cylinder, a screw-conveyer in said bore, and a member in the adjoining bore to interengage with the last named screw-conveyer, there being a receiving opening in communication with one of the said twin bores.

13. The combination of a member having twin bores paralleling one another, one of them having an open end, the other having closed ends, a filter body connecting with the bore having the open end, a screw-conveyer in one of said bores, means in the other of the bores interengaging with the said screw-conveyer, and a device carried by and extending radially of said means between it and an adjacent wall of the member for the purposes set forth.

14. The combination in a filter press, of a body provided with a bore, and a rotatable screw-conveyer therein arranged to revolve in close proximity to the walls of said body and having an open groove in its edge, there being means of communication between the said bore and said groove.

15. The combination in a filter press, of a body provided with a bore, a perforated lining in said bore, and a screw-conveyer also in said bore and having an open groove in the periphery of the same.

16. The combination in a filter press, of a body provided with a bore, a rotatable screw-conveyer therein having its periphery in close proximity to the walls of said body, and an open groove in said periphery, the same being separated at intervals into a series of short grooves.

17. The combination of a body provided with a cylindrical bore, a screw-conveyer rotatable therein and provided in its periphery with a series of open grooves.

18. The combination of a body provided with a cylindrical bore, a screw-conveyer rotatable therein and provided in its periphery with a continuous series of open grooves arranged end to end and separated from one another by a wall.

19. The combination of a body provided with a bore, a screw-conveyer rotatable therein and provided with a series of non-communicating open grooves there being openings in the conveyer through which the grooves communicate with the bore of the said body.

20. A conveyer made up of a series of adjoining and abutting sections each said section provided in its periphery with an open groove, said groove being closed at one end and provided with an opening at its other end.

21. In a filter press the combination with a body having a cylindrical bore, of a screw conveyer revoluble therein and separated from the wall of the bore by a narrow space and provided in its edge with an open groove.

22. In a filter press the combination with a body having a cylindrical bore, of a screw conveyer revoluble therein and separated from the wall of the bore by a narrow space and having a groove extending along its edge which lies adjacent to the wall of said bore, there being an opening in the side of the conveyer communicating with the groove through which the said groove communicates with said bore.

23. The combination of the hollow body of a filter press and its wall, a screw conveyer in said body smaller in diameter than the bore of said body and separated from said wall by an annular space, said conveyer having a series of grooves in its edge lying end to end, and a wall separating each groove from its neighbor, there being a series of openings in the side of the conveyer each communicating with one of the grooves.

24. In a filter press the combination of a member provided with a cylindrical bore, said bore having perforations in its wall, and a screw conveyer revoluble in said member and having in its periphery or face, a groove extending longitudinally along said face, the face of said conveyer being separated from the wall of the bore by a space, there being an opening in the conveyer through which the groove communicates with the said bore.

25. In a filter press the combination of a member, provided with a cylindrical bore, said bore having perforations in its wall, and a screw conveyer revoluble in said member and having its periphery separated therefrom by a space, there being a series of grooves in and extending along said periphery and separated from one another, there also being an opening in the conveyer at each groove through which each communicates with the bore.

26. In a filter press the combination of a body having a cylindrical bore, the walls of said bore being perforate, a screw-conveyer in said bore having its periphery separated from the said walls by a space and provided in its said periphery with a series of grooves, a wall separating adjacent grooves, each said groove having communication with said bore by an opening therefrom in the side of the said conveyer.

27. A screw-conveyer section having a groove in and extending along the periphery of its flight, said flight having an opening in its side communicating with said groove.

28. A screw-conveyer having a groove in the outer face of its flight, said flight having an opening in its side communicating with said groove.

29. The combination in a filter press, of a cylinder, a perforated lining therein and a screw-conveyer within the lining and separated from said lining by a space, said conveyer having a groove in its periphery adjacent the lining.

30. The combination in a filter press, of a cylinder, a perforated lining therein, and a screw-conveyer within the lining and separated from said lining by a space, said conveyer having a groove in its periphery adjacent the lining, there being an opening in the side of said conveyer in communication with the groove.

31. In a filter press the combination of a screw-conveyer comprising a flight continuous and unbroken throughout its length, a body provided with a straight cylindrical bore to receive said conveyer, a discharge opening in the wall of the body for the material separated, means to positively discharge the material, the said conveyer and said means being separated by a space.

32. In a filter press the combination of a screw-conveyer consisting of a flight continuous and unbroken throughout its length, a body provided with a straight cylindrical bore to receive the conveyer, there being a discharge opening in the wall of said body, a member rotatable opposite said opening, the said conveyer and the member being separated by a space, and a device interposed between the member and the conveyer within said space and of a diameter substantially equal to that of the conveyer at the base of its flight, said device extending from the conveyer-hub to the rotatable member.

33. In a filter press the combination of a conveyer comprising a hub and a continuous and unbroken spirally arranged flight thereon, a body to receive said conveyer and having an opening therein remote from said conveyer for the discharge of the material separated a member rotatable opposite said opening to discharge said material therethrough and separated from the conveyer by a space and a device interposed between the member and the conveyer and lying in said space and corresponding in diameter to the diameter of the said hub, and extending between the conveyer-hub and said member.

34. In a filter press the combination of a conveyer comprising a hub and a continuous and unbroken spirally arranged flight, a body to receive said conveyer and having an opening therein remote from the conveyer for the discharge of solid materials, a member rotatable opposite said opening for positively ejecting the material, and provided with a body equal in diameter to the diameter of the conveyer-hub and also separated from the conveyer by a space, and a device extending the full distance between the hubs of the member and conveyer and substantially of the same diameter as said hubs.

35. In a filter press the combination of a body provided with a cylindrical bore, the walls of which are perforate, a screw-conveyer provided with a groove in the periphery thereof lying adjacent the walls of said bore, there being a receiving opening and a discharge opening for solid materials communicating with the bore, the said conveyer lying between them, and a pressure device in said bore comprising two interengaging members to receive the said material.

36. In a filter press the combination of a body provided with a cylindrical bore, the walls of which are perforate, a screw-conveyer provided with a groove in the periphery thereof lying adjacent the walls of said bore, there being a receiving opening and a discharge opening for solid materials communicating with the bore, the said conveyer lying between them a pressure device in said bore comprising two interengaging members to receive the said material, and a member to positively eject the solid material through the discharge opening.

37. In a screw press, the combination with a casing and an expressing screw therein, of a rotary baffle member arranged at the material-receiving end of the casing and engaging between the flights of the screw to compel the advance of the material and to prevent retrograde creeping thereof.

38. In a screw press, the combination with a casing and an expressing screw therein, of a rotary spiral baffle arranged at the material-receiving end of the casing and extending between flights of the screw the full depth of the interval between the flights, and means for positively turning the baffle in a direction to compel the advance of the material toward the outlet and to prevent retrograde creeping of the material.

39. In a screw press, the combination of a casing, a screw conforming to the interior of the casing and operating in close relation thereto, the space between the spiral flanges of the screw, the body of the screw, and the casing, forming a spiral chamber, one of the walls of the chamber having openings for the escape of the fluid, and a rotary baffle having its flanges extending into the spaces between the screw flanges and filling said spaces in a part of the screw inclosed by the casing and closing the receiving end of the spiral chamber.

In testimony whereof we affix our signatures, in presence of two witnesses.

FREDERICK S. GUY.
EDWARD M. SMITH.

Witnesses:
L. M. THURLOW,
ARTHUR KEITHLEY.